UNITED STATES PATENT OFFICE.

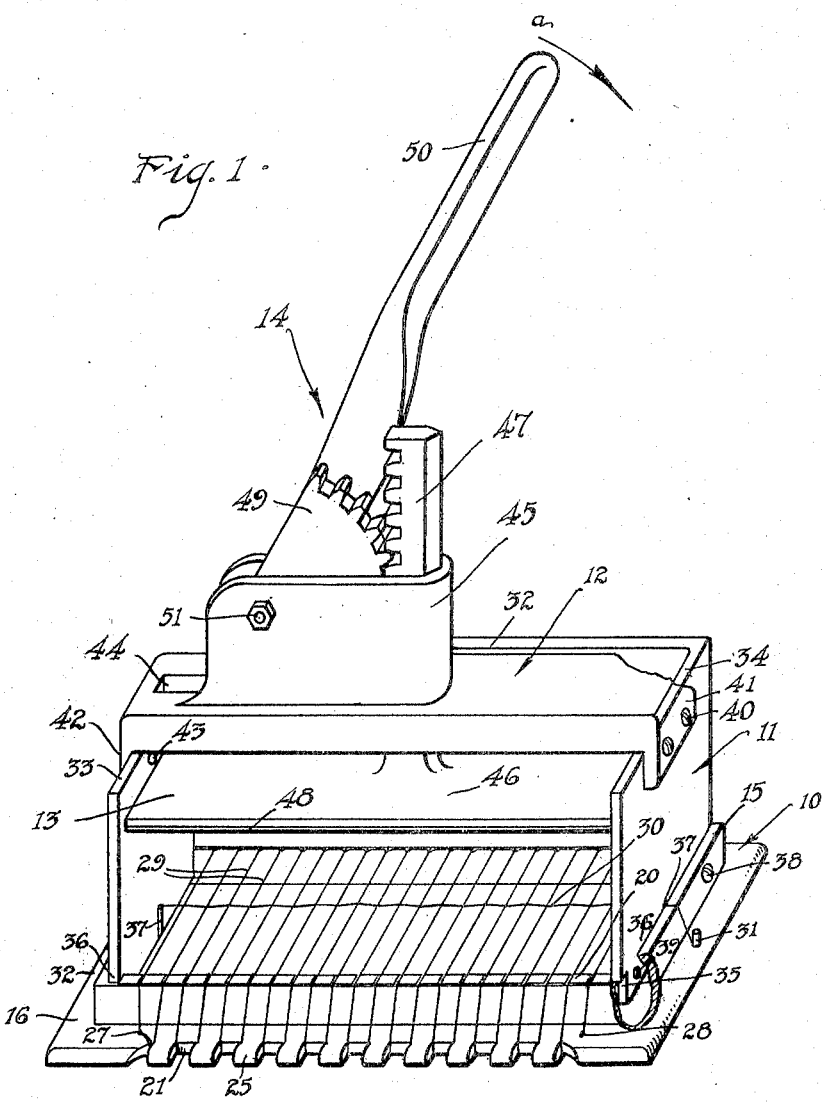
HORACE, ORLANDO J. AND HENRY BOOS.
BUTTER CUTTER.
APPLICATION FILED DEC. 16, 1918.
1,325,869.
Patented Dec. 23, 1919.
Fig. 1.
Fig. 2.
INVENTOR.
Orlando J. Boos
Horace Boos
Henry Boos
BY
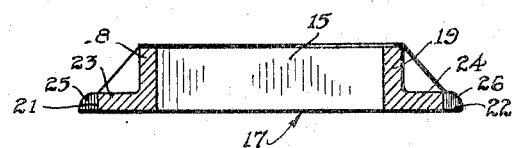
ATTORNEYS

HORACE BOOS, ORLANDO J. BOOS, AND HENRY BOOS, OF LOS ANGELES, CALIFORNIA.

BUTTER-CUTTER.

1,325,869.      Specification of Letters Patent.      Patented Dec. 23, 1919.

Application filed December 16, 1918. Serial No. 267,073.

*To all whom it may concern:*

Be it known that we, HORACE BOOS, ORLANDO J. BOOS, and HENRY BOOS, citizens of the United States, residing at Los Angeles, in the county of Los Angeles and State of California, have invented new and useful Improvements in Butter-Cutters, of which the following is a specification.

Our invention relates to a machine for cutting butter, cheese and the like into small pieces.

The object of our invention is to provide a butter cutter adapted to cut bricks of butter and like material into small square or rectangular portions suitable for use in restaurants, hotels and the like.

With this and other objects in view our invention consists in the construction, combination and arrangement of parts hereinafter described and claimed.

In the accompanying drawings which form a part of this specification,

Figure 1 is a view in perspective of a butter cutter embodying the principles of our invention with parts broken away to more clearly show the construction.

Fig. 2 is a transverse vertical section through the base portion of the machine showing the method of attaching the cutting wires.

As shown in Fig. 1, the cutter is made up of a base member 10, a guide member 11, a supporting bar 12, a plunger 13 and an operating member 14.

The base member 10 is made in the form of a rectangular frame having a vertical rim 15 and horizontal flange 16 and a rectangular opening 17 within the frame walls. The upper edges of the side walls 18 and 19 of the vertical rim 15 each have a series of equally spaced notches 20 filed crosswise of the rim walls so that the notches of the two series are in transverse alinement with each other. A series of square notches 21 and 22 is cut inwardly from the edge of each of the side flanges 23 and 24 of the base member. These notches are of equal width and are equally spaced from each other, their width and the space between them being equal to the spaces between the transverse notches 20 in the upper edge of the rim walls. Lugs or teeth 25 and 26 are formed on the base flanges 23 and 24 by the notches 21 and 22 cut therein. Their width is equal to that of the flange notches 21 and 22 and to the spaces between the transverse notches 20. The flange notches are so cut that the sides of the teeth are in transverse alinement with the transverse notches 20 in the rim portion of the base frame. A thin wire having one end fastened in a hole 27 in the base flange is carried upwardly and transversely over the base frame opening 17 so as to rest in the transverse notches 20 formed in the rim sides 18 and 19. The wire is then carried downwardly into one of the slots 22 and under and around one of the lugs on the opposite side of the frame and is returned over the opening 17 of the base frame to the starting side and under a lug 25 and so on. This back and forth winding is continued from side to side proceeding from one end to the other of the base frame. The wire is tightly drawn across the frame and under the lugs and is finally fixed in a second hole 28 in the base flange. In this way, is formed a series of equally spaced parallel wires 29 stretching across the base frame over the opening 17. The wire is pulled tight enough to make the cross wires quite stiff and to pull them as deeply as possible into the transverse notches 20. A second wire 30, having one end similarly fixed in the base flange at one end of the base frame is carried longitudinally over the base frame and passed alternately over and under cross wires 29 at their middle points and the end is made fast in a hole in the base flange at the opposite end of the base frame by a pin 31.

The guide member 11 of the machine is formed of three vertical walls, a side wall 32 coinciding vertically with rim 19 of the base frame and two end walls 33 and 34 at right angles to the side wall. The end walls are so spaced that they fit between the end walls of the base rim. Notches 35 are cut in the end walls forming shoulders 36 which rest on the base rim, thus supporting the guide member. Slots 37 are cut in the lower edge of the end walls to admit the longitudinal wire 30. The guide member is fixed to the base frame by means of screws 38 passed through holes in the end walls of base rim 15 and screwed into tapped holes 39 in the end walls 33 and 34 of the guide member. The supporting bar 12 extends longitudinally over the middle of the machine and is fixed to the end walls of the guide member by screws 40 through lugs 41 and 42 formed on the supporting bar, these screws being screwed into tapped holes 43 in the end walls 33 and 34. The supporting bar has a longitudinal slot 44 extending from one end to approximately the middle and is provided with a guide yoke 45 formed integral with the supporting bar so that its slot coincides with slot 44. The plunger consists of a rectangular plate 46 formed to closely fit in a horizontal position within the guide walls. It has a gear toothed shank or rack 47 extending vertically upward from its center through slot 44 and guide yoke 45 of the supporting bar. Its under surface is faced with a sheet 48 of cork or rubber to provide a yielding surface for contact with the cutting wires. The operating member 14 consists of a gear toothed sector 49 adapted to coöperate with the gear toothed shank 47 and has an operating handle 50 formed integral with it. It is pivotally mounted within the yoke 45 on a pivot bolt 51.

It will be seen that the cross wires 29 and longitudinal wire 30, all of which serve as the cutting edges of the machine, are arranged to divide the area of the base opening into equal rectangular parts, thus insuring uniformity in the size of the cut pieces.

Operation: When the machine is to be used for butter, it is mounted on a suitable support over a vessel containing cold water, with the handle in a raised position as shown in Fig. 1. The butter brick is inserted between the plunger plate and the cutting wires against the guide walls. The handle 50 is then grasped and pulled downwardly in the direction indicated by the arrow *a* whereupon the toothed sector 49 acting on the rack or toothed shank 47 forces the plunger plate and the butter downwardly until the cutting wires press into the face of the plunger plate. It is evident that the butter will be cut into equal and uniform pieces which will drop into the water below. Thus a pound of butter can be cut into the desired number of equal parts by one stroke of the operating handle.

While we have shown the preferred construction of our butter cutter as now known to us, it is understood that various changes may be made in the construction and combination of parts by those skilled in the art without departing from the spirit of our invention as claimed.

We claim:

1. In a butter cutter, a rectangular frame having a vertical rim and a horizontal flange extending outwardly from the bottom of the rim, there being a rectangular opening within the rim, the upper edges of the side walls of the rim each having a series of equally spaced notches and the outer edges of the horizontal flange having squared notches, the width of the notches being equal to the width of the teeth between the notches, and the sides of the teeth being in alinement with the notches in the rim; a wire fastened at one corner of the flange and carried upwardly and passed backwardly and forwardly under the teeth and over the rim in the rim notches and fastened at the other end of the base; guide walls extending upwardly from the three sides of the frame; a plunger adapted to move between the guide walls and having a cushion of rubber or the like upon its face to engage the wires; and means for operating the plunger.

2. In a butter cutter, a rectangular frame having a vertical rim and a horizontal flange extending outwardly from the bottom of the rim, there being a rectangular opening within the rim, the upper edges of the side walls of the rim each having a series of equally spaced notches and the outer edges of the horizontal flange having squared notches, the width of the notches being equal to the width of the teeth between the notches, and the sides of the teeth being in alinement with the notches in the rim; and a wire fastened at one corner of the flange and carried upwardly and passed backwardly and forwardly under the teeth and over the rim in the rim notches and fastened at the other end of the base.

In testimony whereof we have signed our names to this specification.

HORACE BOOS.
ORLANDO J. BOOS.
HENRY BOOS.